(12) United States Patent
Yamakawa

(10) Patent No.: US 8,720,512 B2
(45) Date of Patent: May 13, 2014

(54) PNEUMATIC TIRE

(75) Inventor: Takahiro Yamakawa, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 13/482,505

(22) Filed: May 29, 2012

(65) Prior Publication Data

US 2012/0318423 A1    Dec. 20, 2012

(30) Foreign Application Priority Data

Jun. 15, 2011 (JP) ................... 2011-133331

(51) Int. Cl.
B60C 13/00 (2006.01)
B60C 13/02 (2006.01)

(52) U.S. Cl.
USPC .......................................... 152/523

(58) Field of Classification Search
USPC ................................. 152/523–525
See application file for complete search history.

(56) References Cited

U.S. PATENT DOCUMENTS

| 4,152,186 A * | 5/1979 | Shibata ......................... 156/123 |
| 2008/0087362 A1 * | 4/2008 | Metz ............................. 152/523 |

FOREIGN PATENT DOCUMENTS

| GB | 2010755 A | 7/1979 |
| JP | S54-107004 A | 8/1979 |
| JP | 2007-022367 A | 2/2007 |
| JP | 2007-320469 A | 12/2007 |
| JP | 2008-126699 A | 6/2008 |
| JP | 2011-37388 A | 2/2011 |
| JP | 2011-084144 A | 4/2011 |

OTHER PUBLICATIONS

The Office Action of the corresponding Japanese Patent Application No. 2011-133331, dated May 21, 2013.
The Office Action of the corresponding Geraman Patent Application No. 10 2012 011 923.2, dated Jan. 14, 2013.

* cited by examiner

*Primary Examiner* — Justin Fischer
*Assistant Examiner* — Kendra Shin
(74) *Attorney, Agent, or Firm* — Global IP Counselors, LLP

(57) ABSTRACT

A pneumatic tire having inconspicuous sidewall surface irregularities. The pneumatic tire includes a plurality of sidewall parts and a tread portion extending between the sidewall parts. At least one sidewall part has a pattern extending in the tire circumferential direction that can be visually differentiated from the surrounding regions of the sidewall surface by an irregularity or reflectance properties of light of the sidewall surface. The pattern includes a plurality of linear protrusions or grooves that extend in a wave shape in a tire circumferential direction while deflecting in a tire radial direction with a period of $\lambda 1$. The line protrusions or grooves have intervals in a tire radial direction, and are non-intersecting. Outer and inner circumferences of the pattern of the tire radial direction are formed by the plurality of linear protrusions or grooves to extend in a wave shape in a tire circumferential direction.

17 Claims, 10 Drawing Sheets

TIRE CIRCUMFERENTIAL DIRECTION

PNEUMATIC TIRE

CROSS-REFERENCE TO RELATED APPLICATIONS

This application claims priority to Japanese Patent Application No. 2011-133331, filed on Jun. 15, 2011, the entire disclosures of Japanese Patent Application No. 2011-133331 are hereby incorporated herein by reference.

BACKGROUND

1. Field of the Invention

The present invention relates to a pneumatic tire having a sidewall part.

2. Background Information

In recent years, the thickness of the sidewalls (herein also referred to as "side gauge") in pneumatic tires has been reduced in order to decrease weight and roll resistance. However, there is a high probability that the sidewall surface will have a poor appearance when the side gauge is reduced. This poor appearance does not negatively affect the durability or other kinematical performance of the tire, but does cause a user to worry whether the tire is defective and has poor durability or other kinematical performance problems.

When a tire is manufactured, a sheet-shaped carcass member is made to wrap around once on a tire-mold drum and the beginning edge and ending edge are joined with a portion overlapping in the molding step. For this reason, the overlapping portion becomes thicker, and this portion appears as an irregularity on the sidewall surface of the final tire. This irregularity is remarkably conspicuous, especially in radial tires in which a single carcass member is used.

A pneumatic tire that makes the irregularity that develops on the sidewall surface of the tire inconspicuous is described in Japanese Laid-open Patent Application No. 2011-37388. That is, a decorative part extending in a belt shape in a tire circumferential direction of the outer surface of the above pneumatic tire has formed thereon a first ridge group and a second ridge group comprising a plurality of ridges arranged so as to extend in a tire radial direction at a predetermined pitch. The irregularity existing on the sidewall surface can be made inconspicuous by a moire pattern formed by the intersection of each ridge of the first ridge group and each ridge of the second ridge group.

SUMMARY

Although there is a variety of other techniques aside from the technique disclosed in Japanese Laid-open Patent Application No. 2011-37388 for making the irregularity that exists on a tire sidewall surface inconspicuous, there is still a need for further improvement to make the irregularity sufficiently inconspicuous. Thus, an object of the present invention is to provide a pneumatic tire in which the irregularity that exists on the sidewall surface can be made sufficiently inconspicuous.

The present invention relates to a pneumatic tire having a sidewall part. The sidewall part has a pattern extending in a tire circumferential direction that can be visually differentiated from the surrounding region by an irregularity or reflectance properties of light of the sidewall surface. The pattern is composed of a plurality of linear protrusions or grooves that extend in a wave shape in a tire circumferential direction while deflecting in a tire radial direction with a period of $\lambda 1$, that have intervals in a tire radial direction, and that do not intersect each other. The outer and inner circumference of the pattern in the tire radial direction is formed by the plurality of linear protrusions or grooves so as to extend in a wave shape in a tire circumferential direction.

It is preferable that the maximum amplitude A1 of the amplitude in the tire radial direction and the period $\lambda 1$ satisfy the expression $0.1 \leq A1/\lambda 1 \leq 1.5$. The width of the plurality of linear protrusions or grooves is formed so as to increase as the position in the tire radial direction approaches the outermost or innermost point of the tire radial direction of the plurality of protrusions or grooves, and so as to decrease as the position in the tire radial direction approaches the center point between the outermost and innermost points.

Furthermore, the positions of the innermost or outermost points of the plurality of linear protrusions or grooves in the tire radial direction are offset from one another in the tire circumferential direction between linear protrusions or grooves that are adjacent in the tire radial direction, and the positions of the outermost or innermost points of the plurality of linear protrusions or grooves in the tire circumferential direction change to a wave shape along the tire radial direction by the positional offset in the tire circumferential direction while deflecting in the tire circumferential direction with a period of $\lambda 2$. It is preferable that the maximum amplitude A1 of the amplitude in the tire radial direction and the period $\lambda 1$ as well as the maximum amplitude A2 of the amplitude in the tire circumferential direction and the period $\lambda 2$ have a relationship that satisfies the expression $A2/\lambda 2 \leq A1/\lambda 1$.

The pattern can be visually differentiated relative to the surrounding regions by subjecting the plurality of linear protrusions or grooves to serration machining using a plurality of ridges arrayed in a single direction. Furthermore, it is preferable that the period $\lambda 1$ be 10 mm or more and 60 mm or less. Additionally, it is preferable that the intervals in the tire radial direction of the plurality of linear protrusions or grooves be 0.2 mm or more and 10 mm or less.

Thus, in a pneumatic tire having the features described above, irregularities that exist on the sidewall surface can be made sufficiently inconspicuous.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

A pneumatic tire according to disclosed embodiments is described below in detail. The tire circumferential direction as stated hereafter refers to the rotational direction of the tread part when the tread part is rotated around the tire rotational axis, and the tire radial direction refers to the direction extending in a radial pattern from the tire rotational axis.

Figure 1:
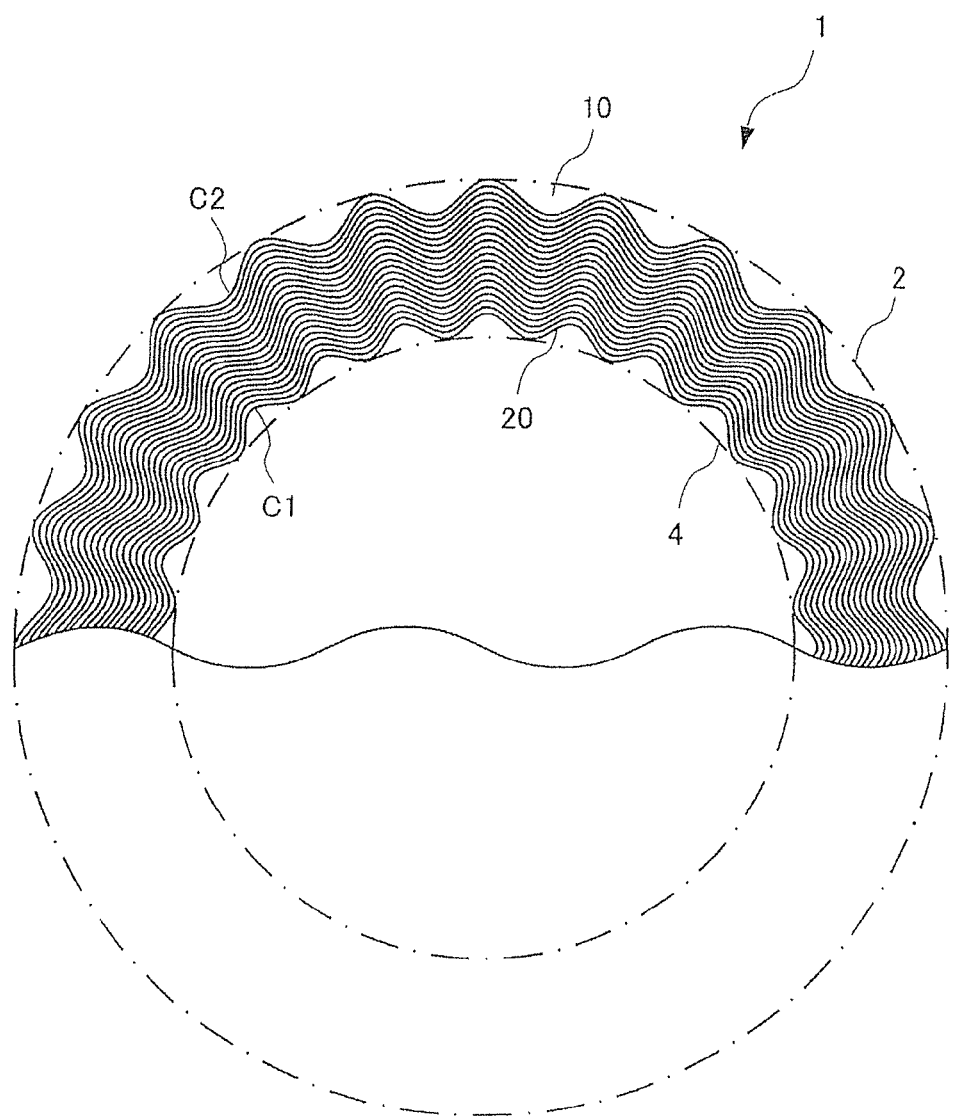
FIG. 1 is a diagram showing the surface of the sidewall part of the pneumatic tire according to a disclosed embodiment.

FIG. 1 is a diagram showing the surface of the sidewall part 3 (see FIG. 2) of the pneumatic tire (hereafter referred to as "tire") according to a disclosed embodiment. As shown in FIG. 1, the tread part 2 is shown by a chain line arc, and the bead part 4 is shown by a chain line arc.

Figure 2:
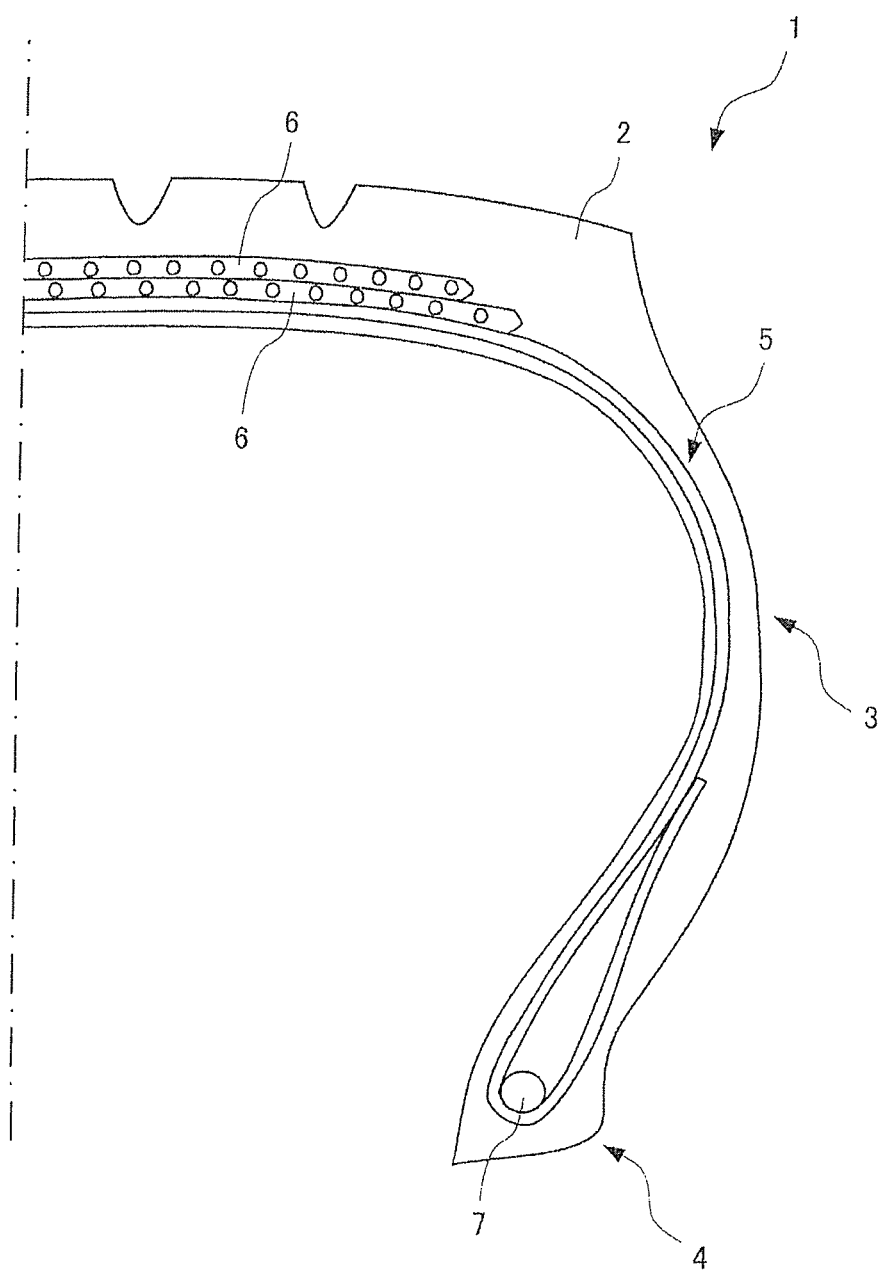
FIG. 2 is a half cross-sectional drawing showing a portion of the pneumatic tire as shown in FIG. 1.

FIG. 2 is a half cross-sectional diagram showing a portion of the tire 1. As shown in FIG. 2, the tire 1 has a tread part 2, a sidewall part 3, a bead part 4, a carcass layer 5, and a belt layer 6. Additionally, the tire 1 has an inner liner layer and the like (not shown). The sidewall part 3 and the bead part 4 having a bead core 7 are arranged on both sides in the tire width direction with the tread part 2 disposed therebetween and constitute a pair.

As shown in FIG. 1, the sidewall part 3 is provided with a side pattern display region 10 and an emblem display region (not shown) on the tire circumference. The emblem display region (not shown) contains the tire product name, brand name, tire manufacturer, as well as letters, symbols, numbers, and the like showing size, and the like of the tire. The side pattern display region 10 is provided around the emblem display region so as to surround the emblem display region. The side pattern display region 10 described below can be provided to the sidewall part 3 on one side in the width direction of the tire 1, or may be provided to the sidewall part 3 on both sides in the width direction of the tire 1.

Figure 4:
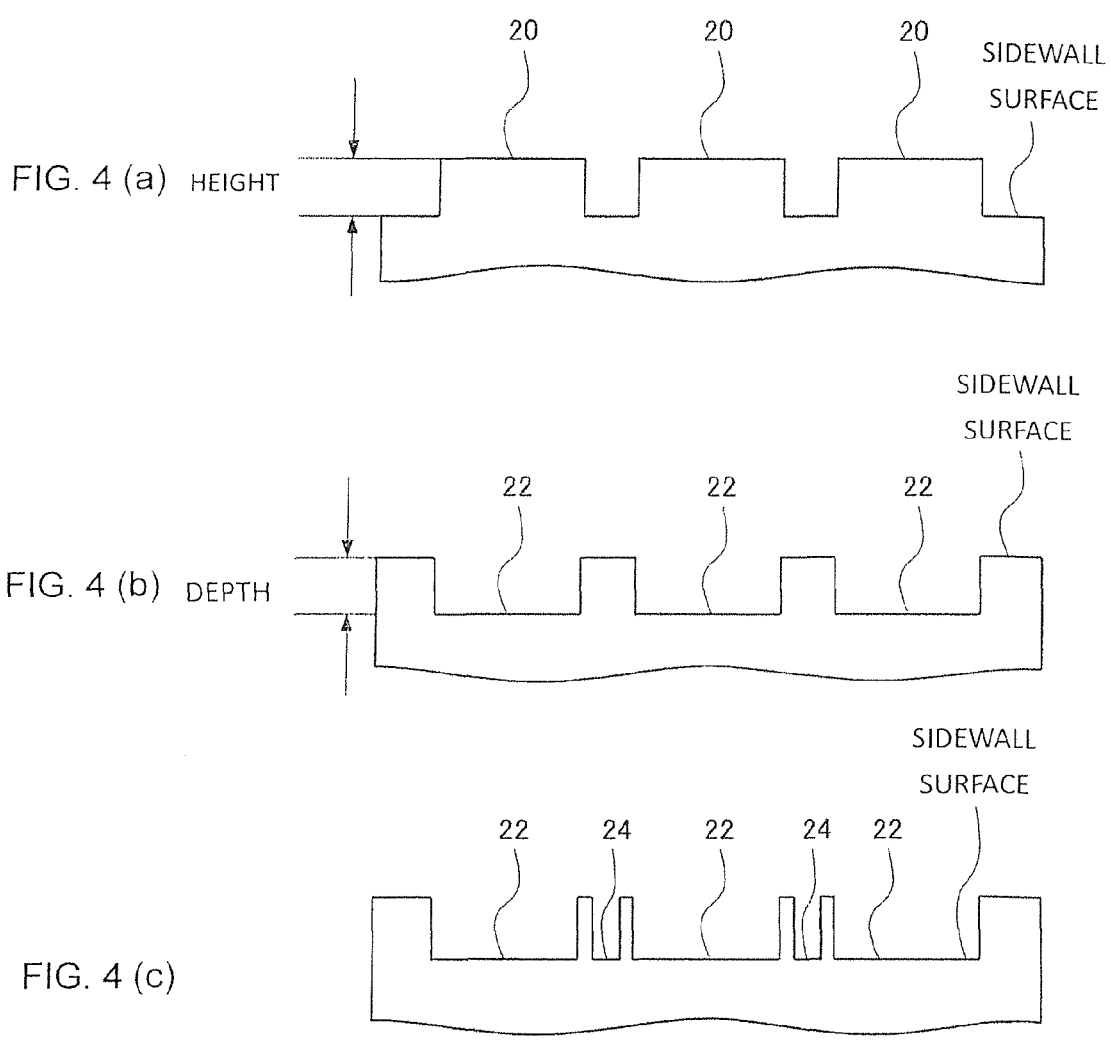
FIGS. 4(a) to 4(c) are diagrams showing a cross-section of examples of the linear protrusions or grooves.

The side pattern display region 10 of the sidewall surface has a side pattern extending in the tire circumferential direction that can be visually differentiated from the surrounding region by irregularities in the sidewall surface or by the reflectance properties of light. This side pattern is formed by providing in intervals in the tire radial direction a plurality of linear protrusions 20 or a plurality of grooves 22 (see FIGS. 4(b) and 4(c)) that extend in the tire circumferential direction in a wave shape while deflecting in the tire radial direction.

Figure 3:
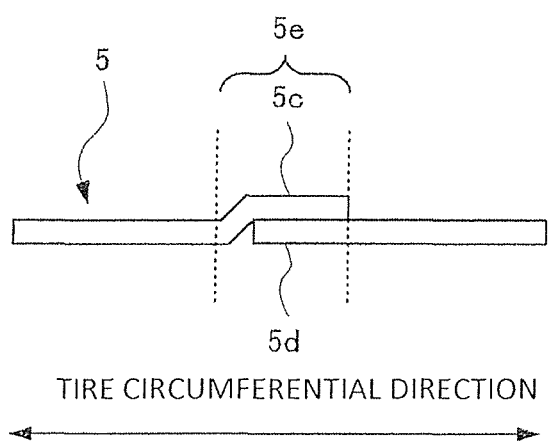
FIG. 3 is a diagram describing an example of the overlap of the carcass member that is the cause of the irregularity that appears on the sidewall surface of the tire.

As shown in FIG. 1, the side pattern is formed by a plurality of linear protrusions 20 that extend sinusoidally in the tire circumferential direction. Such a plurality of linear protrusions 20 or plurality of grooves 22 are provided so that the irregularity that appears on the sidewall surface is less conspicuous by having the person viewing the tire 1 experience a three-dimensional optical illusion by the side pattern formed by the plurality of linear protrusions 20 or plurality of grooves. The irregularity that appears on the sidewall surface is, for example, formed as shown in FIG. 3 as a result of unevenness along the tire radial direction by the overlapping of the ending edge 5c and the beginning edge 5d of the carcass layer 5 at portion 5e. Furthermore, a configuration of side patterns using a plurality of linear protrusions 20 is described below unless a plurality of grooves 20 is specifically described, but the configuration can be similarly applied in the case that a plurality of grooves 22 is used.

As shown in FIG. 1, inner circumference C1 and outer circumference C2 of the tire radial direction of the side pattern are formed by the linear protrusions 20 so as to extend in a wave shape in the tire circumferential direction. The reason that the side pattern is formed in this manner is to give the viewer a three-dimensional optical illusion caused by the depth perception obtained in the tire radial direction that is brought about by the plurality of linear protrusions 20 provided at intervals in the tire radial direction and undulating together in the tire radial direction.

Figure 6:
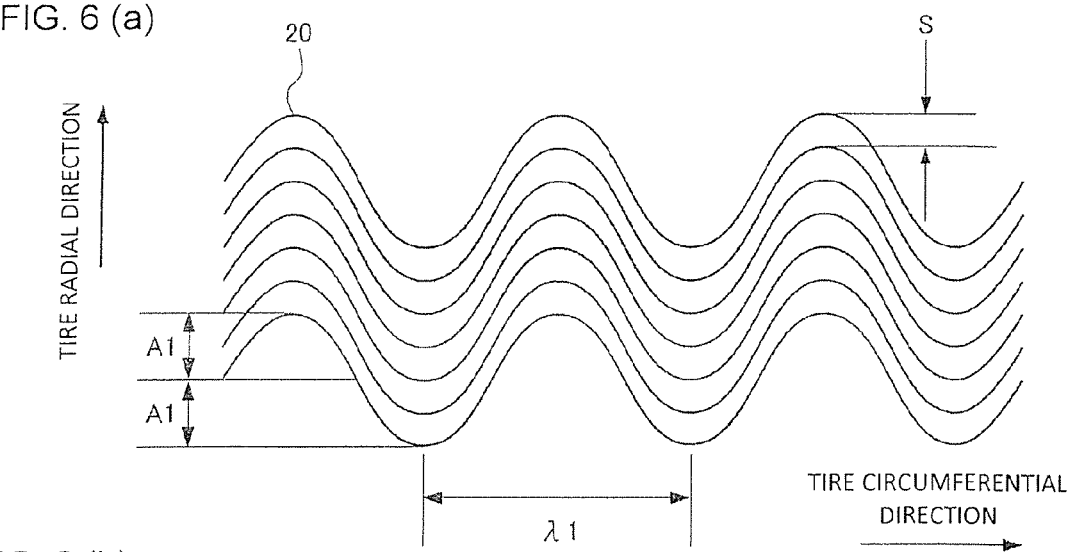
FIGS. 6(a) to 6(c) are diagrams in which the side pattern of the sidewall surface according to a disclosed embodiment is laid out on a straight line.
Figure 6:
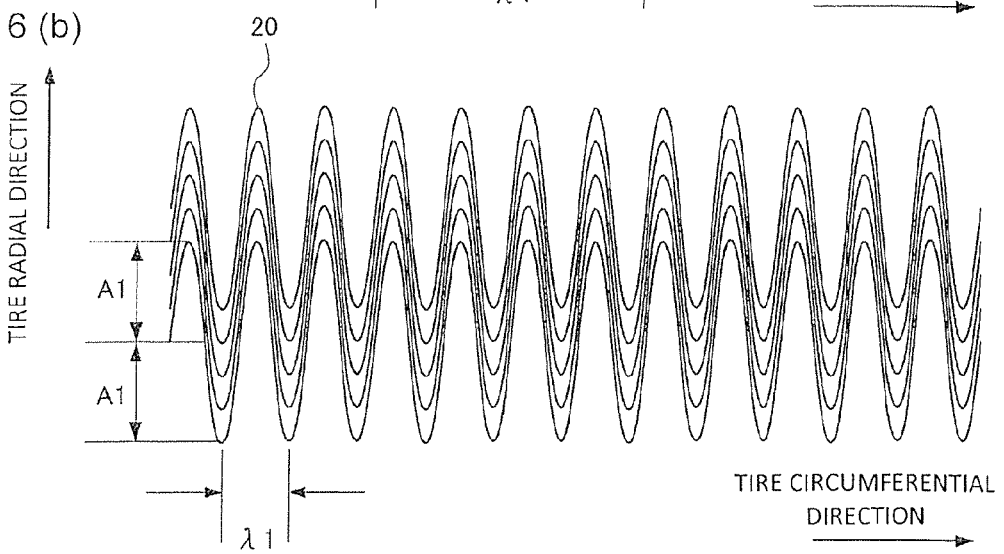
Figure 6:
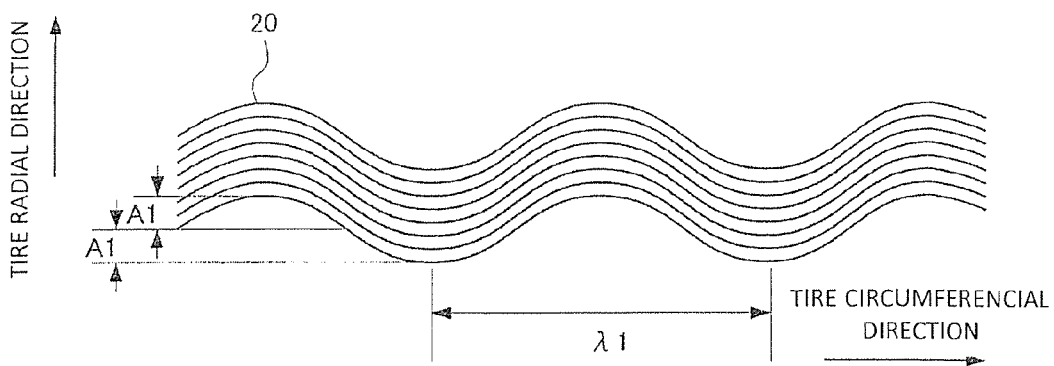

Additionally, as shown in FIG. 1, each of the plurality of linear protrusions 20 is provided along the tire radial direction at a predetermined interval S (see FIG. 6(a)) without intersecting with other linear protrusions 20. It is preferable for the interval S to be, e.g., 0.2 mm or greater and 10 mm or less to give an effective optical illusion to the viewer. Further, each of the plurality of intervals S may be formed to have uniform dimensions with one another in the tire radial direction and also may be formed to be different.

FIGS. 4(a) and 4(b) are diagrams showing an example of a cross-section of the linear protrusions 20 or grooves 22. When the side pattern is formed with linear protrusions 20, as shown in FIG. 4(a), the linear protrusions 20 protrude from the sidewall surface. Further, when the side pattern is formed with grooves 22, as shown in FIG. 4(b), the grooves 22 are provided so as to be indented from the sidewall surface. The grooves 22 can be formed, as shown in FIG. 4(c), by causing the boundary portion between the grooves 22 and the portion 24 not included in the side pattern from the sidewall surface to protrude from the sidewall surface. Further, the grooves 22 in FIG. 4(c) are made to be visually differentiable by subjecting the grooves 22 to serration machining described below.

It is preferable for the height of the linear protrusions 20 or the depth of the grooves 22 to be 0.3 mm to 3.0 mm to give an effective optical illusion to the viewer and make the irregularities that exist on the sidewall surface to be inconspicuous. The height of each of the plurality of linear protrusions 20 or the depth of each of the plurality of grooves 22 may be uniform with one another and may also be different. Further, the height of one linear protrusion 20 or the depth of one groove 22 may be uniform along the tire circumferential direction and may also vary along the tire circumferential direction.

Figure 5:
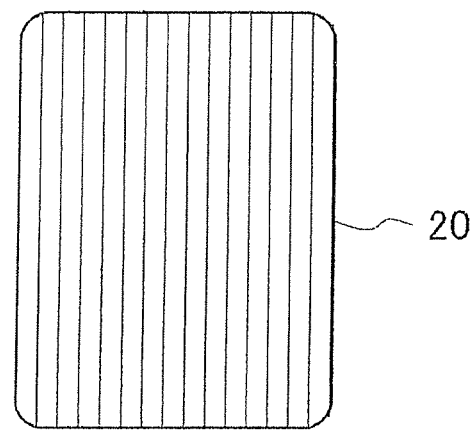
FIG. 5 is a diagram illustrating examples of the very small irregularities imparted to the linear protrusion or groove.

FIG. 5 is a diagram illustrating an example of the surface of the linear protrusion 20. The surface of the linear protrusions 20 may be configured with a minutely irregular surface subjected to serration machining with a plurality of ridges arrayed in a single direction. In addition to the surface of the linear protrusions 20, the surface of the region in which linear protrusions 20 are not formed (unformed region) may also be configured with a minutely irregular surface. In this case, it is preferable for the density of ridges of the linear protrusions 20 and the density of the ridges of the unformed region to differ, and the density of the ridges of the linear protrusions 20 is made higher relative to the density of the ridges of the unformed region. The light incident on the surface of the linear protrusions 20 thereby diffuse and reflect, or the amount of diffusion and reflectance becomes greater than the surroundings. The amount of light that diffuses and reflects at the linear protrusion 20 and enters the viewer's field of vision is therefore less than the amount of light that arrives from the unformed region and enters the viewer's field of vision. For this reason, the linear protrusions 20 appear black relative to the unformed region and can be visually differentiated effectively relative to the unformed region. In this case, the density of the ridges at the linear protrusions 20 is, for example, 1 line/mm to 2 lines/mm and the density of the ridges in the unformed region is, for example, 0.4 lines/mm to 0.8 lines/mm. From the viewpoint of effectively causing the viewer to experience an optical illusion, it is preferable for the density of ridges at the linear protrusions 20 to be, for example, twice the density of the ridges of the unformed region.

Additionally, it is possible to vary at least one of the density of ridges, the direction of the ridges, and the width of the ridges between the linear protrusions 20 and the unformed region to thereby cause the viewer to visually differentiate the regions. The probability of generating poor appearance can be reduced by providing numerous ridges because it is possible make air pockets less liable to occur during the vulcanizing step of the tire manufacturing process. One among the linear protrusions 20 and the unformed region may be subjected to serration machining, and the other may be a smooth surface that is not subjected to serration machining. Further, it is also possible not to subject the surfaces of both the linear protrusions 20 and the unformed region to serration machining.

In this embodiment, the linear protrusions 20 or grooves 22 are formed by providing a surface irregularity to the sidewall surface, but it is possible to use a configuration in which different serration machining is performed without providing a surface irregularity to the sidewall surface, to thereby make use of the reflectance properties of light that generate a difference, whereby the linear protrusions 20 or the grooves 22 can be visually differentiated. In addition to cases of utilizing a difference in reflection due to diffusion and reflection, reflectance properties include cases in which differing directions of reflection are used. For example, the linear protrusions 20 or grooves 22 are made to be a smooth surface, the direction of the smooth surface is made to be sloped, and the directions are varied.

FIGS. 6(a) to 6(c) are diagrams in which the side pattern made on the linear protrusions 20 formed on the sidewall surface according to the first embodiment is laid out on a straight line. Each of the plurality of linear protrusions 20 extends sinusoidally in the tire circumferential direction while deflecting in the tire radial direction at a predetermined period $\lambda 1$. Here, each linear protrusion 20 is formed so that the maximum amplitude in the tire radial direction is A1 (A1>0). It is also preferable that the period $\lambda 1$ be, for example, 10 mm to 60 mm so as to make inconspicuous the irregularity of a width of 4 to 5 mm that is actually generated as a result of the portion 5e where the carcass layer 5 overlaps. It is also preferable that the maximum amplitude A1 in the tire radial direction and the period $\lambda 1$ have a relationship that satisfies the expression $0.1 \leq A1/\lambda 1 \leq 1.5$ so that the viewer experiences a three-dimensional optical illusion. For example, the side pattern shown in FIG. 6(b) is for the case in which the relationship satisfies the expression $A1/\lambda 1=1.5$. Also, the side pattern shown in FIG. 6(c) is for the case in which the relationship satisfies the expression $A1/\lambda 1=0.1$. It is further preferable for the maximum amplitude A1 in the tire radial direction and the period $\lambda 1$ have a relationship that satisfies the expression $0.3 \leq A1/\lambda 1 \leq 1$ to increase the effect of the three-dimensional optical illusion.

Figure 7:
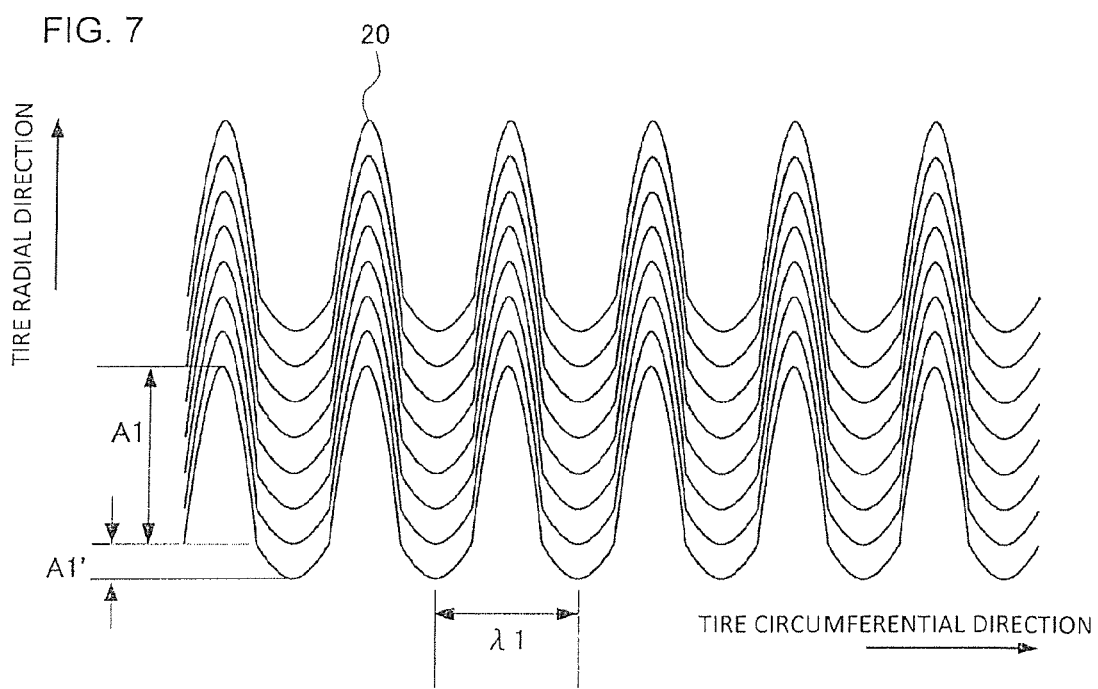
FIG. 7 is a diagram in which the side pattern of the sidewall surface according to a disclosed embodiment is laid out on a straight line.

FIG. 7 is a diagram in which the side pattern made on the sidewall surface according to one embodiment is laid out on a straight line. The side pattern shown in FIG. 7 is formed so that the maximum amplitude A1 of the linear protrusions 20 on the outer side in the tire radial direction is greater than the maximum amplitude A1' of the linear protrusions 20 on the inner side in the tire radial direction when the position at which the amplitude of the linear protrusions 20 in the tire radial direction is 0 is used as a reference. Further, the maximum amplitude A1' of the linear protrusions 20 on the inner side in the tire radial direction may be formed to be greater than the maximum amplitude A1 of the linear protrusions 20 on the outer side in the tire radial direction. The viewer can effectively be made to experience an optical illusion even when the side pattern is formed so that the maximum amplitude A1 of the linear protrusions 20 on the outer side in the tire radial direction and the maximum amplitude A1' of the linear protrusions 20 on the inner side in the tire radial direction are different.

Figure 8:
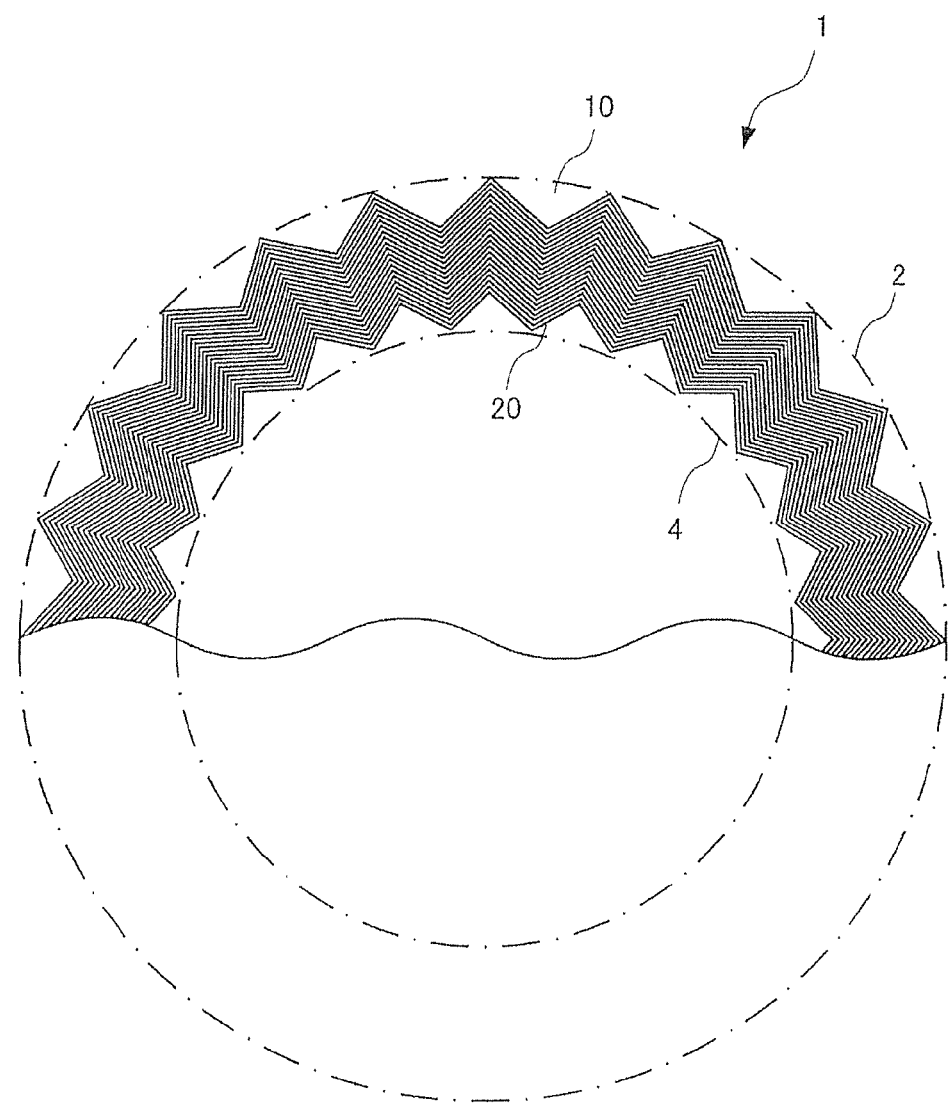
FIG. 8 is a diagram showing a modification of the side pattern according to a disclosed embodiment.

FIG. 8 is a diagram showing a modification of the side pattern made on the sidewall surface of the tire 1 according to another disclosed embodiment. In FIG. 8, the side pattern is formed by a plurality of linear protrusions 20 extending in a triangular wave shape in the tire circumferential direction. In this manner, the viewer can be made to experience an optical illusion even when the side pattern is formed using linear protrusions 20 having a triangular wave shape, because depth perception in the tire radial direction can be obtained by having the position of the plurality of linear protrusions 20 provided with intervals in the tire radial direction undulate together.

Furthermore, each of the plurality of linear protrusions 20 may be formed so as to extend in the tire circumferential direction in a non-sinusoidal shape other than a triangular wave so long as it does not intersect with other linear protrusions 20. However, it is preferred that the side pattern to be formed by sinusoidal linear protrusions 20 in that it gives the viewer a smooth visual impression.

Figure 9:
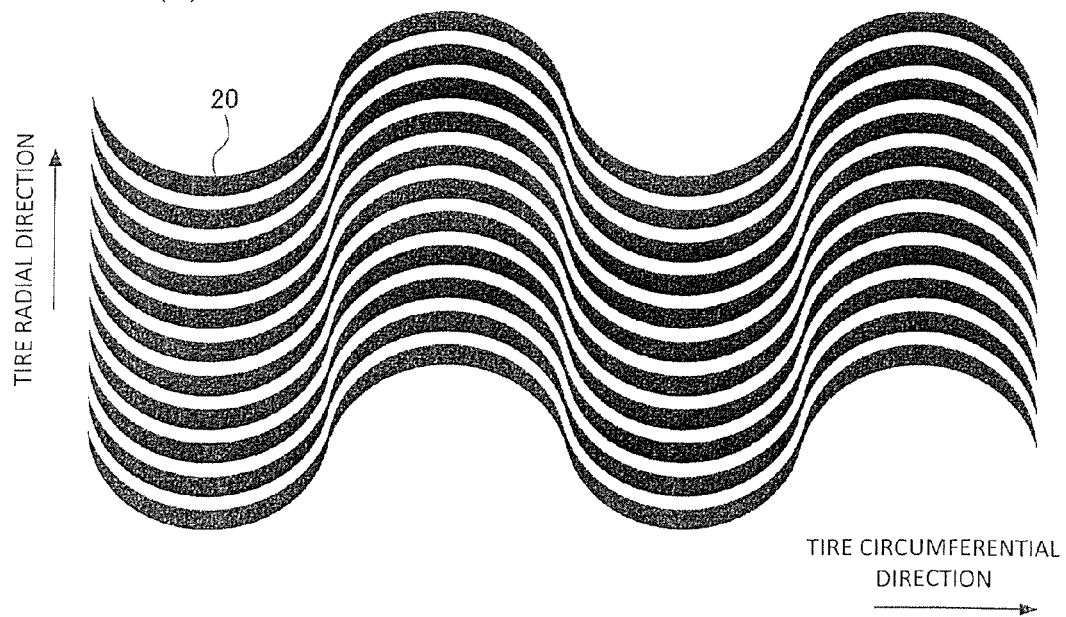
FIGS. 9(a) and 9(b) are diagrams describing the side pattern of the sidewall surface according to another disclosed embodiment.
Figure 9:
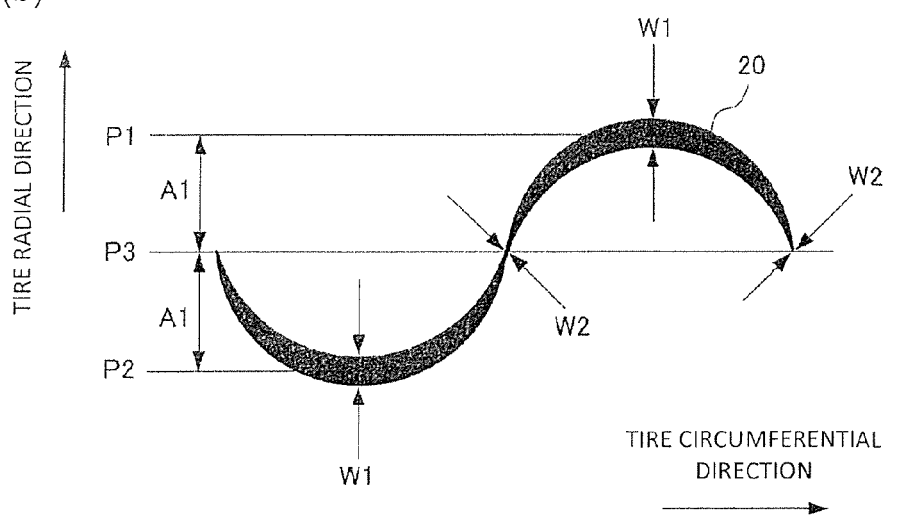

FIGS. 9(a) and 9(b) are diagrams showing the side pattern of the sidewall surface of the tire 1 according to another embodiment. The configuration of the tire 1 of this embodiment is the same as the configuration of the tire 1 of the first embodiment shown in FIG. 2. The point in which the tire 1 according to this embodiment differs from the tire 1 according to the embodiment described with regard to FIGS. 1 to 8 is that the width of each of the plurality of linear protrusions 20 that constitutes the side pattern varies in periodic fashion, as shown in FIG. 9(a).

As shown in detail in FIG. 9(b), the width of the linear protrusions 20 increases as the position of the linear protrusions 20 in the tire radial direction approaches the outermost point P1 or innermost point P2 in the tire radial direction (the width of the linear protrusions 20 at the outermost point P1 or the innermost point P2 is shown by W1). Furthermore, the width of the linear protrusions 20 decreases as the position of the linear protrusions 20 in the tire radial direction approaches the center point P3 between the outermost point P1 and the innermost point P2 (the width of the linear protrusions 20 at the center point P3 is shown by W2). Here, the outermost point P1 or the innermost point P2 shows the position at which the amplitude of the linear protrusions 20 in the tire radial direction becomes the maximum amplitude A1. Furthermore, the center point P3 shows the position at which the amplitude of the linear protrusions 20 in the tire radial direction becomes 0.

In other words, the width of the linear protrusions 20 becomes the maximum value W1 at the position at which the amplitude of the linear protrusions 20 in the tire radial direction becomes the maximum amplitude A1, and becomes the minimum value W2 at the position at which the amplitude of the linear protrusions 20 in the tire radial direction becomes 0. Here, the width of the linear protrusions 20 varies in periodic fashion between the minimum value W2 and the maximum value W1 because the linear protrusions 20 are formed so as to extend in a wave shape in the tire circumferential direction while oscillating in the tire radial direction. In this case, the side pattern shown in FIG. 9(a) gives the appearance that the linear protrusions 20 rise three-dimensionally due to the effect of the optical illusion at the position where the position in the tire radial direction is the outermost point in the tire radial direction. The irregularity that exists on the sidewall surface can thereby be made to be less conspicuous.

Figure 10:
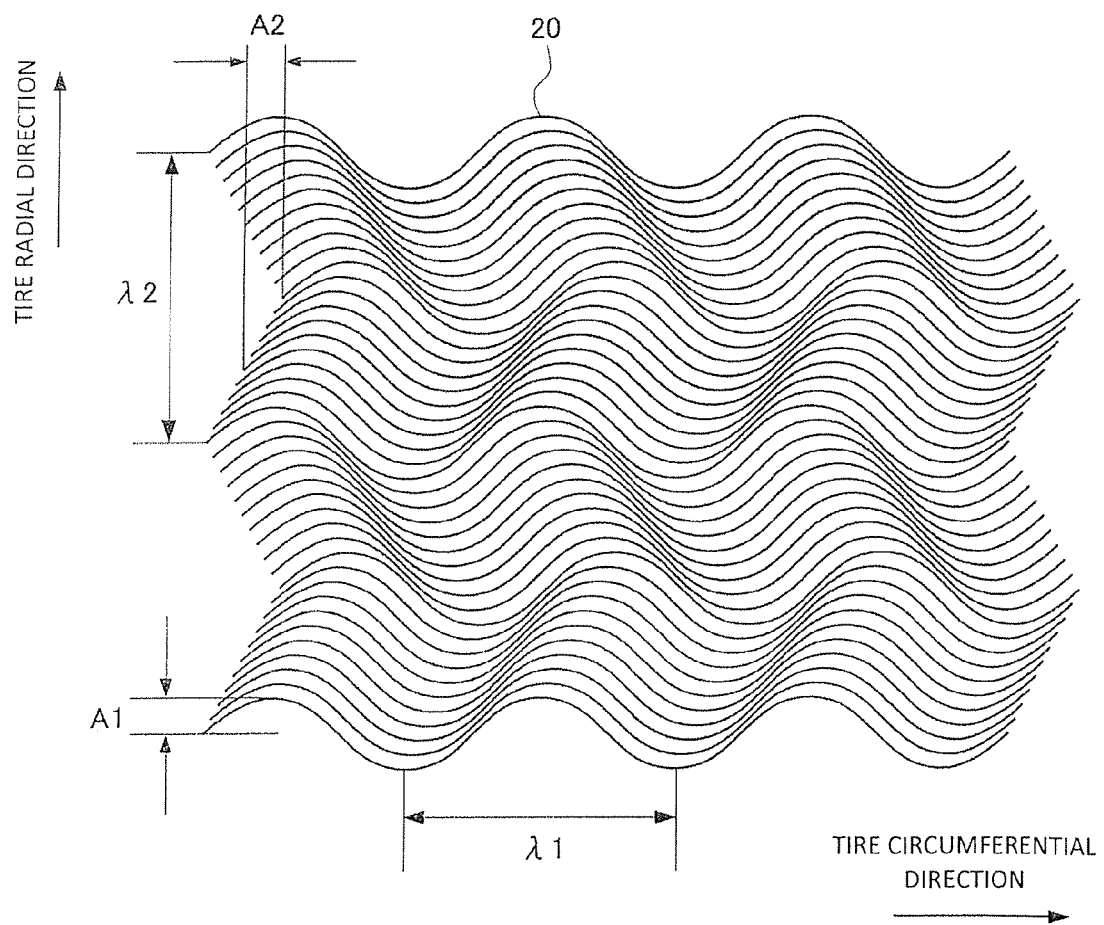
FIG. 10 is a diagram describing the side pattern of the sidewall surface according to a further disclosed embodiment.

FIG. 10 is a diagram describing the side pattern of the sidewall surface of the tire 1 according to another embodiment. The configuration of the tire 1 according to this embodiment is the same as the configuration of the tire 1 according to the embodiment as shown in FIGS. 1 to 8. The point in which the tire 1 according to this embodiment differs from the tire 1 according to each of the previously described embodiments is that the position in the tire circumferential direction (herein referred to as "tire radial direction position") of the outermost point or the innermost point in the tire radial direction of each of the plurality of linear protrusions 20 that constitutes the side pattern varies in a wave shape along the tire radial direction, as shown in FIG. 10.

As further shown, each of the plurality of linear protrusions 20 extend sinusoidally in the tire circumferential direction while deflecting in the tire radial direction at a predetermined period $\lambda 1$ in the same manner as the embodiment shown in FIGS. 1 to 8. Further, the tire circumferential direction positions of the outermost point or innermost point in the tire radial direction of each of the plurality of linear protrusions 20 are offset from each other in the tire circumferential direction between the linear protrusions 20 that are adjacent in the tire radial direction. Because of this positional offset, the tire circumferential direction positions of the outermost point or the innermost point in the tire radial direction of each of the plurality of linear protrusions 20 varies in a wave shape along the tire radial direction while deflecting in the tire circumferential direction at a predetermined period $\lambda 2$. Here, the maximum amplitude in the tire circumferential direction is formed to be A2 (A2>0). It is preferable that the period $\lambda 2$ be, for example, 5 mm to 30 mm to make the irregularity that exists on the sidewall surface inconspicuous. It is also preferred that the maximum amplitude A1 in the tire radial direction, and that the period $\lambda 1$ as well as the maximum amplitude A2 in the tire circumferential direction and the period $\lambda 2$ have a relationship that satisfies the expression $A2/\lambda 2 \leq A1/\lambda 1$ in order for the viewer to experience a three-dimensional optical illusion. The tire circumferential direction position of the outermost point or the innermost point in the tire radial direction of each of the plurality of linear protrusions 20 may be formed so as to vary along the tire radial direction sinusoidally or non-sinusoidally in a triangular wave and the like.

EXAMPLES

The tire 1 (tire size: 145R12 6PR) shown in FIG. 2 was manufactured with various changes in the side pattern of the sidewall surface in order to examine the effects of the disclosed embodiments. The manufactured tires were examined by 100 people, and the visibility of the irregularity generated as a result of the portion 5e where the carcass layer 5 overlaps (hereinafter referred to as BPS splice irregularity) was evaluated.

The ratings below are used as an evaluation result:
Rating 120: 97% or more of the observers were unable to clearly confirm the BPS splice irregularity;
Rating 118: From 95% or more and less than 97% of the observers were unable to clearly confirm the BPS splice irregularity;
Rating 116: From 90% or more and less than 95% of the observers were unable to clearly confirm the BPS splice irregularity;
Rating 114: From 85% or more and less than 90% of the observers were unable to clearly confirm the BPS splice irregularity;
Rating 112: From 80% or more and less than 85% of the observers were unable to clearly confirm the BPS splice irregularity;
Rating 110: From 75% or more and less than 80% of the observers were unable to clearly confirm the BPS splice irregularity;
Rating 108: From 70% or more and less than 75% of the observers were unable to clearly confirm the BPS splice irregularity;
Rating 106: From 65% or more and less than 70% of the observers were unable to clearly confirm the BPS splice irregularity;
Rating 104: From 60% or more and less than 65% of the observers were unable to clearly confirm the BPS splice irregularity;
Rating 102: From 55% or more and less than 60% of the observers were unable to clearly confirm the BPS splice irregularity;
Rating 100: From 50% or more and less than 55% of the observers were unable to clearly confirm the BPS splice irregularity;
Rating 98: From 45% or more and less than 50% of the observers were unable to clearly confirm the BPS splice irregularity; and
Rating 97: Less than 45% of the observers were unable to clearly confirm the BPS splice irregularity.

The sidewall surfaces used in the evaluation and the evaluation results are shown in the tables below. The comparative example is a tire without a side pattern display region 10. In Examples 1 to 5, the ratio of the maximum amplitude A1 of the amplitude in the tire radial direction and the period $\lambda 1$ in the tire radial direction of the linear protrusions 20, i.e., $A1/\lambda 1$ was varied.

In Example 6, the width of each of the plurality of linear protrusions 20 was varied so as to increase as the position in the tire radial direction approaches the outermost point or the innermost point in the tire radial direction, and so as to decrease as the position in the tire radial direction approaches the center point between the outermost point and the innermost point. The ratio between the minimum value and the maximum value of the width of the linear protrusions 20 is shown in the "irregularity width ratio" row of the tables below.

In Example 7, the tire circumferential direction position at the outermost point or the innermost point in the tire radial direction of each of the plurality of linear protrusions 20 was offset in the tire circumferential direction so as to oscillate in a wave shape while deflecting in the tire circumferential direction with a period $\lambda 2$. Further, the presence or absence of displacement of the tire circumferential direction position at the outermost point or the innermost point in the tire radial direction is shown in the "presence/absence of circumferential direction amplitude and radial direction period" row of the tables below.

Furthermore, in Example 8, the maximum amplitude A1 of the amplitude in the tire radial direction and the period $\lambda 1$ as well as the maximum amplitude A2 of the amplitude in the tire circumferential direction and the period $\lambda 2$ were set so as to have a relationship that satisfies the expression $A2/\lambda 2 \leq A1/\lambda 1$. In Example 9, each of the plurality of linear protrusions 20 was subjected to serration machining. Furthermore, the lengths of the period λ1 were varied in Examples 10 to 14.

In addition, the intervals in the tire radial direction of the plurality of linear protrusions 20 were varied in Examples 15 to 19. The intervals in the tire radial direction of the plurality of linear protrusions 20 are shown in the "radial direction interval of the irregularity" row of the tables below.

TABLE 1

|  | Comparative Example | Example 1 | Example 2 | Example 3 | Example 4 | Example 5 |
|---|---|---|---|---|---|---|
| Pattern presence | No | Yes | ← | ← | ← | ← |
| A1/λ1 | — | 0.05 | 0.1 | 0.5 | 1.5 | 1.7 |
| Irregularity width ratio | — | 1 | ← | ← | ← | ← |
| Presence/absence of circumferential direction amplitude and radial direction period | — | No | ← | ← | ← | ← |
| A2/λ2 | — | — | — | — | — | — |
| Serration presence | — | No | ← | ← | ← | ← |
| Length of λ1 (mm) | — | 5 | ← | ← | ← | ← |
| Radial direction interval of the irregularity (mm) | — | 0.1 | ← | ← | ← | ← |
| Rating | 97 | 100 | 102 | 104 | 102 | 98 |

TABLE 2

|  | Comparative Example | Example 6 | Example 7 | Example 8 | Example 9 |
|---|---|---|---|---|---|
| Pattern presence | No | Yes | ← | ← | ← |
| A1/λ1 | — | 0.5 | ← | ← | ← |
| Irregularity width ratio | — | 7 | ← | ← | ← |
| Presence/absence of circumferential direction amplitude and radial direction period | — | No | Yes | ← | ← |
| A2/λ2 | — | — | 0.6 | 0.2 | ← |
| Serration presence | — | No | ← | ← | Yes |
| Length of λ1 (mm) | — | 5 | ← | ← | ← |
| Radial direction interval of the irregularity (mm) | — | 0.1 | ← | ← | ← |
| Rating | 97 | 106 | 108 | 110 | 112 |

TABLE 3

|  | Comparative Example | Example 10 | Example 11 | Example 12 | Example 13 | Example 14 |
|---|---|---|---|---|---|---|
| Pattern presence | No | Yes | ← | ← | ← | ← |
| A1/λ1 | — | 0.05 | ← | ← | ← | ← |
| Irregularity width ratio | — | 7 | ← | ← | ← | ← |
| Presence/absence of circumferential direction amplitude and radial direction period | — | Yes | ← | ← | ← | ← |
| A2/λ2 | — | 0.2 | ← | ← | ← | — |
| Serration presence | — | Yes | ← | ← | ← | ← |
| Length of λ1 (mm) | — | 10 | 15 | 55 | 60 | 65 |
| Radial direction interval of the irregularity (mm) | — | 0.1 | ← | ← | ← | ← |
| Rating | 97 | 114 | 116 | 116 | 114 | 98 |

TABLE 4

|  | Comparative Example | Example 1 | Example 2 | Example 3 | Example 4 | Example 5 |
|---|---|---|---|---|---|---|
| Pattern presence | No | Yes | ← | ← | ← | ← |
| A1/λ1 | — | 0.5 | ← | ← | ← | ← |
| Irregularity width ratio | — | 7 | ← | ← | ← | ← |
| Presence/absence circumferential direction amplitude and radial direction period | — | Yes | ← | ← | ← | ← |
| A2/λ2 | — | 0.2 | ← | ← | ← | ← |
| Serration presence | — | Yes | ← | ← | ← | ← |
| Length of λ1 (mm) | — | 10 | ← | ← | ← | ← |
| Radial direction interval of the irregularity (mm) | — | 0.1 | 0.5 | 5 | 10 | 20 |
| Rating | 97 | 118 | 120 | 120 | 118 | 98 |

It is apparent from the comparison of a Comparative Example and Example 1 that the rating result improves by providing a side pattern composed of a plurality of linear protrusions 20 or grooves 22 that extend in a wave shape in the tire circumferential direction while deflecting in the tire radial direction at a predetermined period λ1, that have intervals in the tire radial direction, and that do not intersect one another. This may be said to be a result of the optical illusion effect of the side pattern composed of a plurality of linear protrusions 20 or a plurality of grooves 22.

It is also apparent from a comparison of Examples 1 to 5 that the rating results improve as the maximum amplitude A1 of the amplitude in the tire radial direction and the period λ1 is set to have a relationship that satisfies the expression $0.1 \leq A1/\lambda1 \leq 1.5$. It is further apparent from a comparison of Examples 3 and 6 that the rating result improves by varying the width of each of the plurality of linear protrusions 20.

In addition, it is apparent from a comparison of Examples 6 and 7 that the rating result improves as the tire circumferential direction position of the outermost point or the innermost point in the tire radial direction of the plurality of linear protrusions 20 is offset in the tire circumferential direction so as to oscillate in a wave shape while deflecting in the tire circumferential direction with a period λ2. It is also apparent from a comparison of Examples 7 and 8 that the rating result improves as the maximum amplitude A1 of the amplitude in the tire radial direction and the period λ1 as well as the maximum amplitude A2 of the amplitude in the tire circumferential direction and the period λ2 are set to have a relationship that satisfies the expression $A2/\lambda2 \leq A1/\lambda1$. It is further apparent from a comparison of Examples 8 and 9 that the rating result is improved by performing serration machining. Furthermore, the rating result can be improved by setting the period λ1 to be 10 mm or more and 60 mm or less as shown in Examples 10 to 14. In addition, the rating result improves by setting the interval the plurality of linear protrusions 20 in the tire radial direction to be 0.2 or more and 10 mm or less.

The pneumatic tire according to disclosed embodiments has been described in detail above, but it should be understood that the present invention is not limited to the embodiments described above and that a variety of improvements and changes to the present invention may be made without departing from the scope of the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
   a plurality of sidewall parts and a tread portion between the sidewall parts, at least one of the sidewall parts including a sidewall surface having a non-patterned portion and a pattern extending in a tire circumferential direction that is visually differentiated from surrounding regions of the sidewall surface by an irregularity or reflectance properties of light;
   the pattern includes a plurality of linear protrusions or grooves that extend in a wave shape in the tire circumferential direction while deflecting in a tire radial direction with a period of λ1, the linear protrusions or grooves have intervals in the tire radial direction and are non-intersecting with each other, and a maximum amplitude A1 of the linear protrusions or grooves in the tire radial direction and the period λ1 have a relationship such that $0.1 \leq A2/\lambda1 \leq 1.5$; and
   outer and inner circumferences of the pattern in the tire radial direction are formed by the plurality of linear protrusions or grooves to extend in the wave shape in the tire circumferential direction, the outer circumference of the pattern defining an outer circumference boundary between the pattern and the non-patterned portion and the inner circumference of the pattern defining an inner circumference boundary between the pattern and the non-patterned portion, and a width of the plurality of linear protrusions or grooves is formed so as to increase in the tire radial direction approaching an outermost position or an innermost position of the tire radial direction of the plurality of protrusions or grooves, so as to decrease in the tire radial direction approaching a center position between the outermost and innermost positions.

2. The pneumatic tire according to claim 1, wherein the period $\lambda 1$ is within a range of 10 mm to 60 mm inclusive.

3. The pneumatic tire according to claim 1, wherein the intervals in the tire radial direction of the plurality of linear protrusions or grooves is within a range of 0.2 mm to 10 mm inclusive.

4. The pneumatic tire according to claim 1, wherein the wave shape is a triangular wave shape in the tire circumferential direction.

5. The pneumatic tire according to claim 1, wherein the plurality of linear protrusions or grooves are serrated to include a plurality of ridges arrayed in a single direction.

6. The pneumatic tire according to claim 1, wherein the period $\lambda 1$ is within a range of 10 mm to 60 mm inclusive.

7. The pneumatic tire according to claim 1, wherein the intervals in the tire radial direction of the plurality of linear protrusions or grooves is within a range of 0.2 mm to 10 mm inclusive.

8. A pneumatic tire comprising:
a plurality of sidewall parts and a tread portion between the sidewall parts, at least one of the sidewall parts including a sidewall surface having a pattern extending in a tire circumferential direction that is visually differentiated from surrounding regions of the sidewall surface by an irregularity or reflectance properties of light;
the pattern includes a plurality of linear protrusions or grooves that extend in a wave shape in the tire circumferential direction while deflecting in a tire radial direction with a period of $\lambda 1$, the linear protrusions or grooves have intervals in the tire radial direction and are non-intersecting with each other;
outer and inner circumferences of the pattern in the tire radial direction are formed by the plurality of linear protrusions or grooves to extend in the wave shape in the tire circumferential direction; and
a width of the plurality of linear protrusions or grooves is formed so as to increase in the tire radial direction approaching an outermost position or an innermost position of the tire radial direction of the plurality of protrusions or grooves, and so as to decrease in the tire radial direction approaching a center position between the outermost and innermost positions.

9. The pneumatic tire according to claim 8, wherein innermost or outermost positions of the plurality of linear protrusions or grooves in the tire radial direction are offset from one another in the tire circumferential direction between those of the linear protrusions or grooves that are adjacent in the tire radial direction, and the outermost or innermost positions of the plurality of linear protrusions or grooves in the tire circumferential direction change to the wave shape along the tire radial direction by the offset in the tire circumferential direction while deflecting in the tire circumferential direction with a period of $\lambda 2$.

10. The pneumatic tire according to claim 8, wherein the plurality of linear protrusions or grooves are serrated.

11. The pneumatic tire according to claim 8, wherein the plurality of linear protrusions or grooves are serrated to include a plurality of ridges arrayed in a single direction.

12. The pneumatic tire according to claim 8, wherein the period $\lambda 1$ is within a range of 10 mm to 60 mm inclusive.

13. A pneumatic tire comprising:
a plurality of sidewall parts and a tread portion between the sidewall parts, at least one of the sidewall parts including a sidewall surface having a pattern extending in a tire circumferential direction that is visually differentiated from surrounding regions of the sidewall surface by an irregularity or reflectance properties of light;
the pattern includes a plurality of linear protrusions or grooves that extend in a wave shape in the tire circumferential direction while deflecting in a tire radial direction with a period of $\lambda 1$, the linear protrusions or grooves have intervals in the tire radial direction and are non-intersecting with each other;
outer and inner circumferences of the pattern in the tire radial direction are formed by the plurality of linear protrusions or grooves to extend in the wave shape in the tire circumferential direction; and
innermost or outermost positions of the plurality of linear protrusions or grooves in the tire radial direction are offset from one another in the tire circumferential direction between those of the linear protrusions or grooves that are adjacent in the tire radial direction, and the outermost or innermost positions of the plurality of linear protrusions or grooves in the tire circumferential direction change to the wave shape along the tire radial direction by the offset in the tire circumferential direction while deflecting in the tire circumferential direction with a period of $\lambda 2$.

14. The pneumatic tire according to claim 13, wherein a maximum amplitude A1 of the linear protrusions or grooves in the tire radial direction and the period $\lambda 1$, and a maximum amplitude A2 of the linear protrusions or grooves in the tire circumferential direction and a period $\lambda 2$ of the linear protrusions or grooves have a relationship such that $A2/\lambda 2 \leq A1/\lambda 1$.

15. A pneumatic tire comprising:
a plurality of sidewall parts and a tread portion between the sidewall parts, at least one of the sidewall parts including a sidewall surface having a pattern extending in a tire circumferential direction that is visually differentiated from surrounding regions of the sidewall surface by an irregularity or reflectance properties of light;
the pattern includes a plurality of linear protrusions or grooves that extend in a wave shape in the tire circumferential direction while deflecting in a tire radial direction with a period of $\lambda 1$, the linear protrusions or grooves have intervals in the tire radial direction and are non-intersecting with each other;
outer and inner circumferences of the pattern in the tire radial direction are formed by the plurality of linear protrusions or grooves to extend in the wave shape in the tire circumferential direction; and
at least one of the following:
the plurality of linear protrusions or grooves are serrated; and
the plurality of linear protrusions or grooves are serrated to include a plurality of ridges arrayed in a single direction.

16. A pneumatic tire comprising:
a plurality of sidewall parts and a tread portion between the sidewall parts, at least one of the sidewall parts including a sidewall surface having a non-patterned portion and a pattern extending in a tire circumferential direction that is visually differentiated from surrounding regions of the sidewall surface by an irregularity or reflectance properties of light;

the pattern includes a plurality of linear protrusions or grooves that extend in a wave shape in the tire circumferential direction while deflecting in a tire radial direction with a period of $\lambda 1$, the linear protrusions or grooves have intervals in the tire radial direction and are non-intersecting with each other, and a maximum amplitude A1 of the linear protrusions or grooves in the tire radial direction and the period $\lambda 1$ have a relationship such that $0.1 \leq A1/\lambda 1 \leq 1.5$;

outer and inner circumferences of the pattern in the tire radial direction are formed by the plurality of linear protrusions or grooves to extend in the wave shape in the tire circumferential direction, the outer circumference of the pattern defining an outer circumference boundary between the pattern and the non-patterned portion and the inner circumference of the pattern defining an inner circumference boundary between the pattern and the non-patterned portion; and innermost or outermost positions of the plurality of linear protrusions or grooves in the tire radial direction are offset from one another in the tire circumferential direction between those of the linear protrusions or grooves that are adjacent in the tire radial direction, and the outermost or innermost positions of the plurality of linear protrusions or grooves in the tire circumferential direction change to the wave shape along the tire radial direction by the offset in the tire circumferential direction while deflecting in the tire circumferential direction with a period of $\lambda 2$.

17. A pneumatic tire comprising:

a plurality of sidewall parts and a tread portion between the sidewall parts, at least one of the sidewall parts including a sidewall surface having a non-patterned portion and a pattern extending in a tire circumferential direction that is visually differentiated from surrounding regions of the sidewall surface by an irregularity or reflectance properties of light;

the pattern includes a plurality of linear protrusions or grooves that extend in a wave shape in the tire circumferential direction while deflecting in a tire radial direction with a period of $\lambda 1$, the linear protrusions or grooves have intervals in the tire radial direction and are non-intersecting with each other, a maximum amplitude A1 of the linear protrusions or grooves in the tire radial direction and the period $\lambda 1$ have a relationship such that $0.1 \leq A1/\lambda 1 \leq 1.5$, and the plurality of linear protrusions or grooves are serrated; and outer and inner circumferences of the pattern in the tire radial direction are formed by the plurality of linear protrusions or grooves to extend in the wave shape in the tire circumferential direction, the outer circumference of the pattern defining an outer circumference boundary between the pattern and the non-patterned portion and the inner circumference of the pattern defining an inner circumference boundary between the pattern and the non-patterned portion.

* * * * *